J. C. RUMMER.
GRADE INDICATOR.
APPLICATION FILED DEC. 20, 1918.
1,319,249.
Patented Oct. 21, 1919.
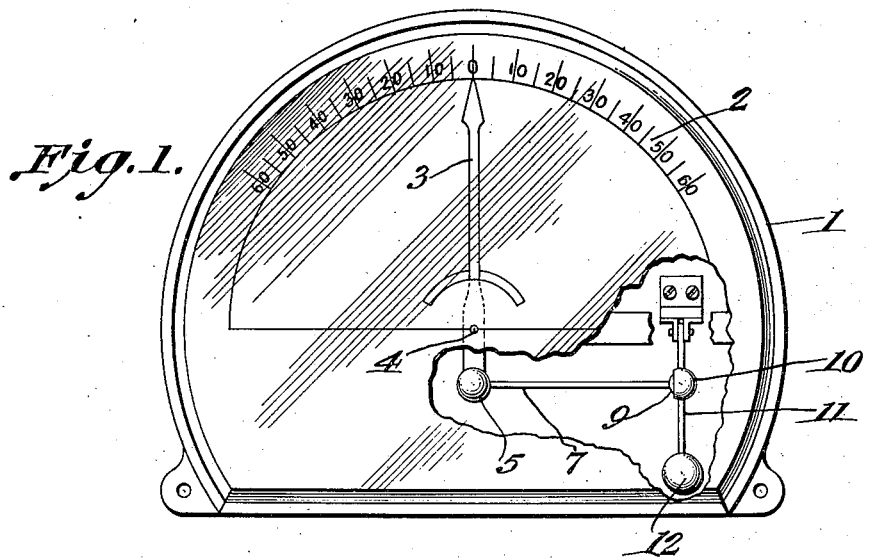
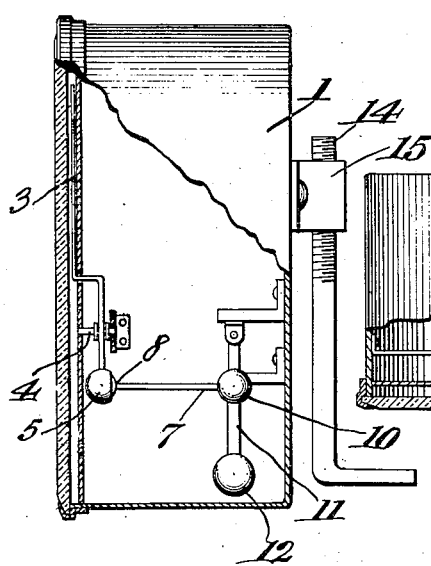
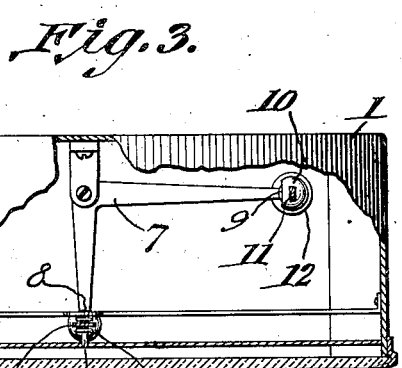
Witnesses
Inventor
J. C. Rummer
By Victor J. Evans
Attorney

UNITED STATES PATENT OFFICE.

JOHN C. RUMMER, OF FLEMINGTON, PENNSYLVANIA.

GRADE-INDICATOR.

1,319,249.

Specification of Letters Patent.

Patented Oct. 21, 1919.

Application filed December 20, 1918. Serial No. 267,656.

*To all whom it may concern:*

Be it known that I, JOHN C. RUMMER, a citizen of the United States, residing at Flemington, in the county of Clinton and State of Pennsylvania, have invented new and useful Improvements in Grade-Indicators, of which the following is a specification.

My present invention pertains to indicators and it consists in a peculiar and advantageous device designed for use on automobiles and other vehicles with a view of indicating the percentage of the grade that is being traversed by the vehicle.

The invention in all of its details will be fully understood from the following description and claims when the same are read in connection with the drawings accompanying and forming part of this specification, in which:

Figure 1 is a front elevation of the indicator constituting the best practical embodiment of my invention of which I am cognizant.

Fig. 2 is a side elevation of the indicator with the casing partly broken away.

Fig. 3 is a plan view of the indicator with the casing partly broken away.

Similar numerals of reference designate corresponding parts in all of the views of the drawings.

My novel indicator is designed to be carried on the dash board, instrument board or any other suitable part of an automobile or other vehicle, and it preferably, though not necessarily, comprises a casing which may be of any construction compatible with the purposes of the invention.

Carried by the casing or frame 1 is an arcuate scale 2 which is preferably graduated or marked as shown, and mounted to swing in a vertical plane in front of the said scale 2 is a pointer 3 which is pivoted at an intermediate point in its length as indicated at 4, and is provided with a proportionately heavy lower arm shaped to form the socket member 5 of a ball and socket joint.

Fulcrumed to swing in a plane at right angles to the plane of the pointer 3 is a bell crank 7 having balls 8 and 9 at its ends. The ball 8 is disposed in the socket member 5 of the pointer 3, and the ball 9 is similarly arranged in a socket 10 carried at an intermediate point of the length of a pendent lever 11. This lever 11 is pivotally connected at its upper end to the frame, and its lower arm is in the form of a bulbular receptacle 12 in which is a charge of quicksilver or equivalent material to lend the desired weight to said arm.

At 14 is a threaded bolt disposed in a bearing 15, in order that the indicator may be correctly adjusted and fixed on different dashboards or instrument boards, and at 15 is a cross bar complementary to the casing or frame of the device.

It will be apparent from the foregoing that the pendent lever 11 will delicately conform to the grade being traversed by the automobile or other vehicle equipped with my novel indicator, with the result that through the medium of the bell crank 7 the pointer 3 will be moved relative to the scale 2 and will be yieldingly maintained in position to indicate the percentage of the grade.

Having described my invention, what I claim and desire to secure by Letters Patent, is:

1. A grade indicator comprising an arcuate scale, a pointer fulcrumed at an intermediate point of its length and having an upper arm movable relatively to the scale and a lower arm shaped to form the socket member of a ball and socket joint, a bell-crank mounted to move in a plane at right angles to the plane of movement of the pointer and having balls at its ends, one of which is disposed in said socket, a pendent lever having a socket at an intermediate point in its length receiving the other ball of the bell crank and also having its lower arm shaped to form a receptacle, and a fluid weight in said receptacle.

2. In a grade indicator, an arcuate scale, a pointer fulcrumed at an intermediate point and having an upper arm movable relatively to said scale, a bell crank movable at right angles to the pointer and connected to the lower arm thereof, and a pendent lever connected at an intermediate point of its length to the bell crank and having a weighted lower portion.

In testimony whereof I affix my signature.

JOHN C. RUMMER.